(12) United States Patent
Quigg

(10) Patent No.: US 7,540,311 B2
(45) Date of Patent: Jun. 2, 2009

(54) EZ GAS TANK ADAPTOR

(76) Inventor: James R. Quigg, 1927 Harbor Blvd., #201, Costa Mesa, CA (US) 92627

( * ) Notice: Subject to any disclaimer, the term of this patent is extended or adjusted under 35 U.S.C. 154(b) by 58 days.

(21) Appl. No.: 11/843,607

(22) Filed: Aug. 22, 2007

(65) Prior Publication Data

US 2009/0051162 A1    Feb. 26, 2009

(51) Int. Cl.
  B65B 1/04    (2006.01)
  B65B 3/00    (2006.01)
(52) U.S. Cl. .................. 141/287; 141/350; 220/86.2
(58) Field of Classification Search ............. 141/287, 141/350; 220/86.2
  See application file for complete search history.

(56) References Cited

U.S. PATENT DOCUMENTS

| | | | | |
|---|---|---|---|---|
| 2,908,299 A | * | 10/1959 | Gosselin | 141/287 |
| 3,830,267 A | * | 8/1974 | Cass | 141/287 |
| 3,845,792 A | * | 11/1974 | Johnson | 141/46 |
| 3,903,942 A | * | 9/1975 | Vest | 141/301 |
| 4,131,141 A | * | 12/1978 | Weissenbach | 141/285 |
| 4,235,263 A | * | 11/1980 | Lake, Jr. | 141/1 |
| 6,095,207 A | * | 8/2000 | Enders | 141/348 |
| 7,096,758 B1 | | 8/2006 | Ferkany et al. | |

* cited by examiner

Primary Examiner—Timothy L Maust
(74) Attorney, Agent, or Firm—Walter A. Hackler

(57) ABSTRACT

An automobile gas tank adaptor includes a fill tube insertable into an automobile fuel tank filler neck along with a nozzle receptacle which is slidably disposable over the fill tube for receiving a nozzle. An expandable collar is disposed around the fill tube for expanding and locking the fill tube within the fuel tank filler neck as the nozzle receptacle is slid over the fill tube.

12 Claims, 2 Drawing Sheets

EZ GAS TANK ADAPTOR

Modern automobile gas tank fuel systems provide for reduced gasoline vapor loss. This is typically done by reducing the diameter of the gas tank filler neck.

In addition, gasoline and nozzles are typically equipped with air pollution control equipment such as a gasoline fume return holes.

While these developments have reduced needless loss of fuel, older automobiles having larger diameter fuel tank filler necks do not often provide an adequate receiver for the modern nozzles consequently defeating the intended purpose of the modern nozzles.

The present invention provides for an automobile gas tank adaptor for use with such automobiles in order to provide efficient coupling with modern gasoline dispensing nozzles.

SUMMARY OF THE INVENTION

An automobile gas tank adaptor in accordance with the present invention generally includes a fill tube insertable into an automobile fuel tank filler neck. A nozzle receptacle is provided which is sildably disposable over the fill tube for receiving a fuel nozzle and an expandable collar is disposed around the fill tube for expanding and locking the fill tube within the fuel tank filler neck as the nozzle receptacle is slid over the fill tube. Thus, the assembled nozzle receptacle and fill tube is stabilized within the filler neck before subsequent entry by a fuel nozzle.

More particularly, the collar includes a first end fixed to the fill tube proximate a bottom thereof and a second end slidable along the fill tube. The collar includes perforations between the first and second ends which enable venting of the gas tank when the collar is expanded. This enables conventional operation of the nozzle with the adaptor.

The collar and the nozzle receptacle have approximately the same diameter thus enabling a nozzle receptacle to compress the collar as the nozzle receptacle is slit over the fill tube. Such compression of the collar causes expansion thereof between the collar first and second ends.

The fill tube includes tabs disposed at a top thereof to prevent the top from insertion into the filler neck and the nozzle receptacle includes guide slots for passing over the fill tube tabs as the nozzle receptacle is slid over the fill tube. The guide slots include detents for releasably locking the nozzle receptacle to the fill tube with the collar compressed.

BRIEF DESCRIPTION OF THE DRAWINGS

The advantages and features of the present invention will be more clearly understood with reference to the following detailed description when considered in conjunction with the appended drawings of which.

DETAILED DESCRIPTION

Figure 1:
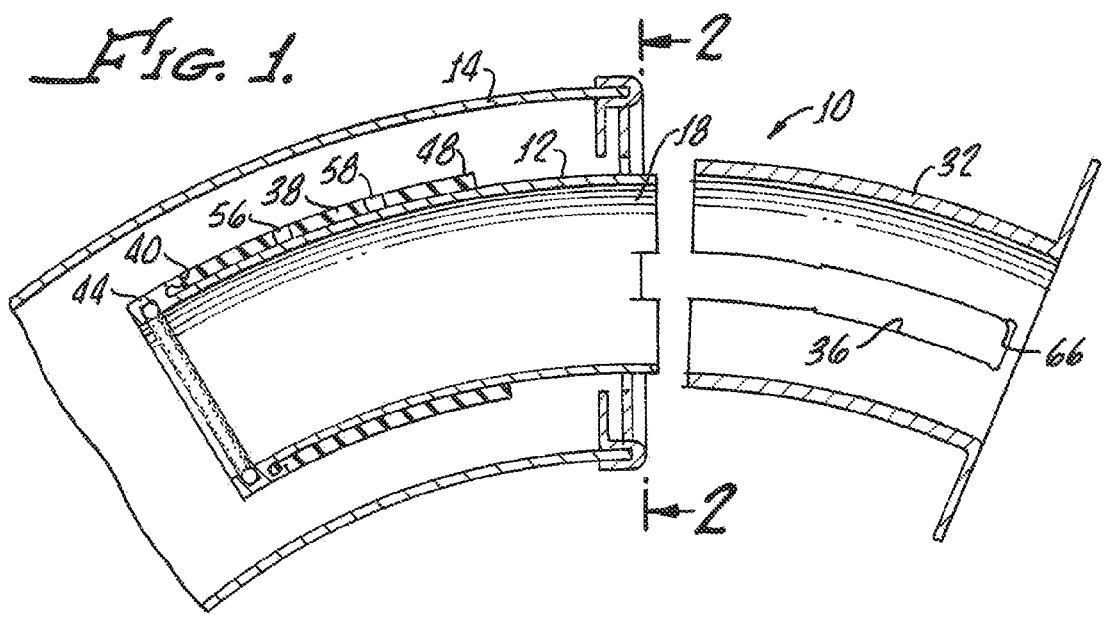
FIG. 1 is a cross sectional view of the present invention generally illustrating the insertion of a fill tube into an automobile fuel tank filler neck and a nozzle receptacle illustrated in a spaced apart relationship with the fill tube.

With reference to FIG. 1, there is shown in an automobile gas tank adaptor 10 which generally includes a fill tube 12 insertable into an automobile fuel tank filler neck 14 through an opening 18.

Figure 2:
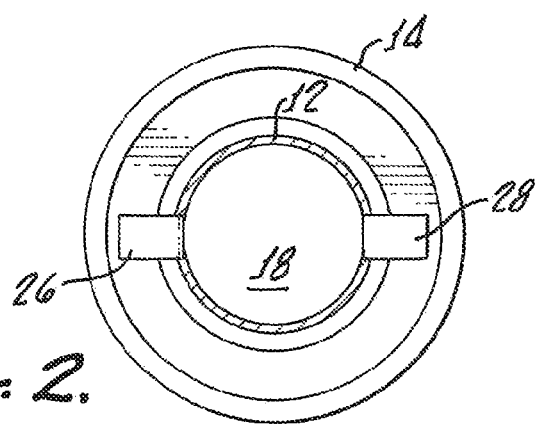
FIG. 2 is a view taken along the line 2-2 of FIG. 1 illustrating fill tube tabs for preventing complete insertion of the fill tube into the fuel tank filler neck.

As more clearly shown in FIG. 2, the fill tube includes outstanding tabs 26, 28 to prevent totally entry of the fill tube 12 through the opening 18.

Figure 3:
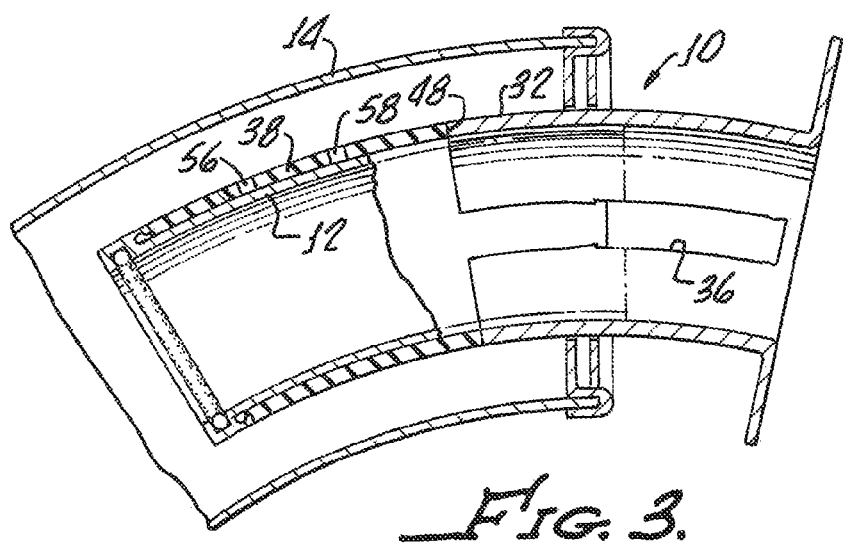
FIG. 3 is a view similar to FIG. 1 showing partial insertion of the nozzle receptacle over the fill tube.

With reference again to FIG. 1, a nozzle receptacle 32 is slidably disposable over the fill tube 12 as illustrated in FIG. 3 and includes guide slots 36 for passing over the fill tube tabs 26, 28.

With reference to FIGS. 1, 3-5 an expandable collar 38, which can be made from any suitable elastic material, is disposed around the fill tube and includes a diameter of approximately the same size as the diameter of the nozzle receptacle 32, best shown in FIG. 3.

The collar 38 includes a first end 40 fixed to the fill tube bottom 44 and a second end 48 slidable along the fill tube 12.

Figure 4:
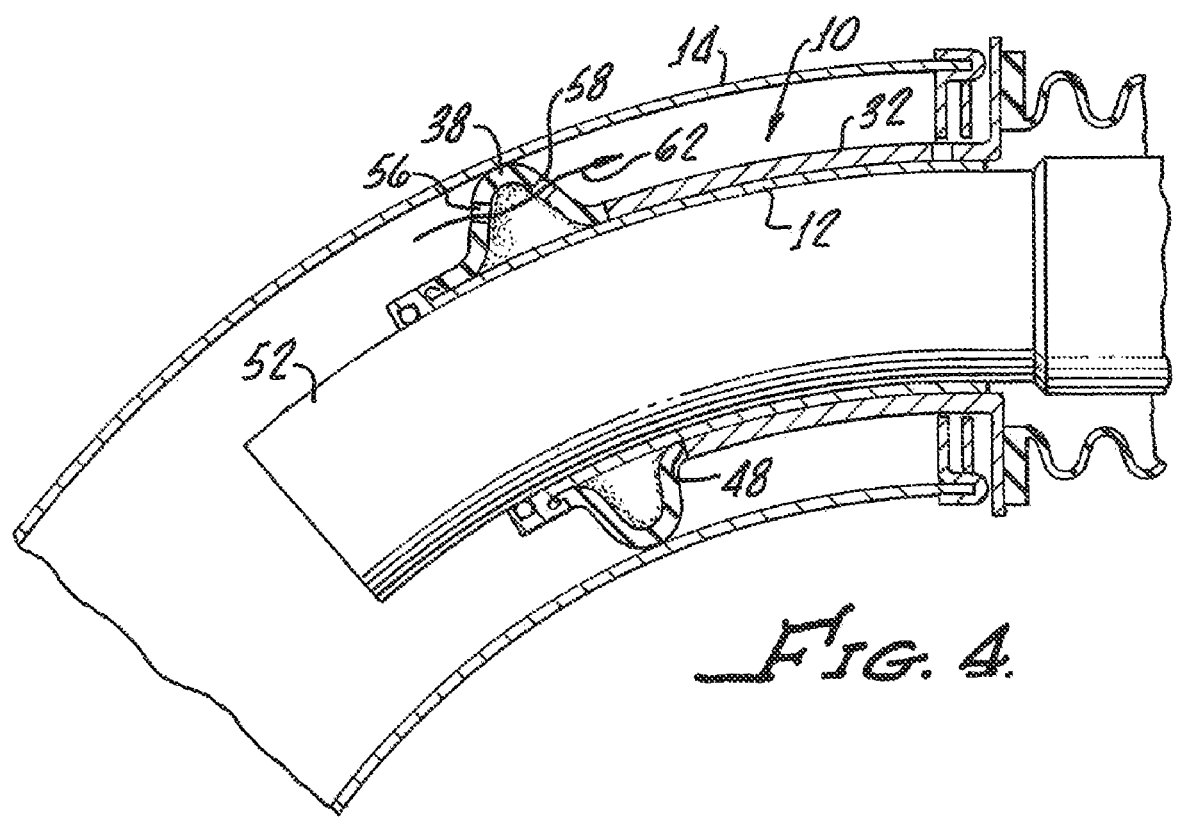
FIG. 4 is a cross section view illustrating complete insertion of the nozzle receptacle over the fill tube and compression of an expandable collar in order to lock the fill tube within the fuel tank filler neck.
Figure 5:
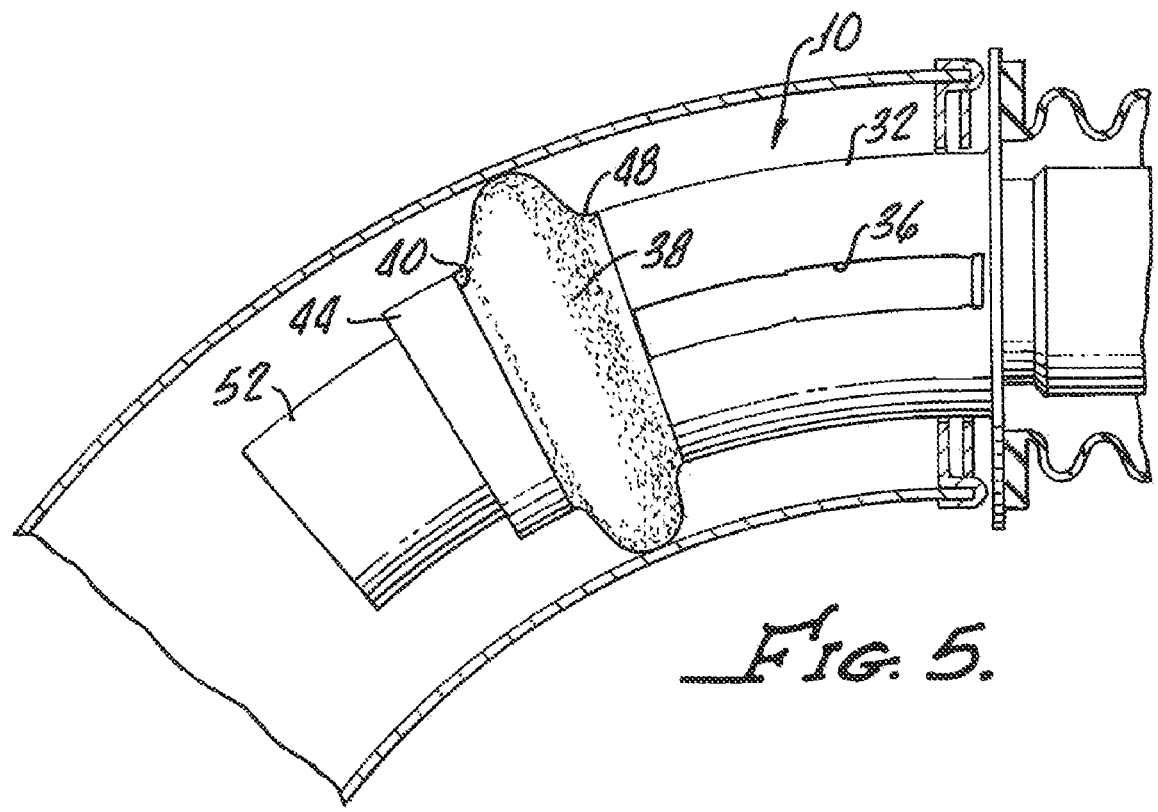
FIG. 5 is a view similar to that shown in FIG. 4 but showing a side view of the invention as installed with a fuel nozzle in an automobile fuel tank filler neck.

As illustrated in FIGS. 4 and 5, when the nozzle receptacle 32 is fully inserted, the collar 38 is compressed causing expansion thereof between the collar first end 40 and second end 48. This locks and stabilizes the adaptor 10 within the filler neck 14 for subsequent insertion of a fuel nozzle 52 as shown in FIGS. 4 and 5. FIG. 4 shows the adaptor 10 in cross section and FIG. 5 shows the adaptor 10 in side view within the filler neck 14. Perforations 56, 58 are formed in the collar 38 between the first end 40 and second end 48 to enable venting of the gas tank (not shown) as illustrated by the arrow 62 in FIG. 4.

In order to temporarily hold the fill tube 12 and nozzle receptacle together with the collar compressed, as shown in FIGS. 4 and 5, the guide slots 36 may include a detent 66 for snapping over the tabs 26, 28.

Following fueling of the gas tank (not shown) through the nozzle 52 and removal of the nozzle 52 from the assembled fill tube 12 and nozzle receptacle 32 the receptacle 32 may be popped away from the fill tube 12 thus collapsing the collar 38 and enabling the removal of the fill tube 12 from the filler neck 14.

Although there has been hereinabove described a specific gas tank adaptor in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. An automobile gas tank adapter comprising:
a fill tube insertable into an automobile fuel tank filler neck;
a nozzle receptacle, slidably disposable over said fill tube, for receiving a fuel nozzle; and
an expandable collar, disposed around said fill tube for expanding and locking said fill tube within said fuel tank filler neck as the nozzle receptacle is slid over said fill tube, said collar and said nozzle receptacle having approximately the same diameter for enabling the nozzle receptacle to compress said collar as the nozzle receptacle is slid over said fill tube, compression of said collar causing expansion thereof between the collar first and second ends.

2. An automobile gas tank adapter comprising:

a fill tube insertable into an automobile fuel tank filler neck;

a nozzle receptacle, slidably disposable over said fill tube, for receiving a fuel nozzle; and an expandable collar, disposed around said fill tube for expanding and locking said fill tube within said fuel tank filler neck as the nozzle receptacle is slid over said fill tube, the collar including a first end fixed to said fill tube proximate a bottom thereof and a second end slidable along said fill tube.

3. The adapter according to claim 2 wherein the collar includes perforations between the first and second ends to enable venting of the gas tank when the collar is expanded.

4. The adapter according to claim 3 wherein said fill tube includes tabs disposed at a top thereof to prevent the top from insertion into the filler neck.

5. The adapter according to claim 4 wherein said nozzle receptacle includes guide slots for passing over the fill tube tabs as said nozzle receptacle is slid over said fill tube.

6. The adapter according to claim 5 wherein said collar and said nozzle receptacle have approximately the same diameter for enabling the nozzle receptacle to compress said collar as the nozzle receptacle is slid over said fill tube, compression of said collar causing expansion thereof between the collar first and second ends.

7. The adapter according to claim 6 wherein said guide slots include detents for releasably locking said nozzle receptacle to said fill tube with the collar compressed.

8. The adapter according to claim 1 wherein the collar includes a first end fixed to said fill tube proximate a bottom thereof and a second end slidable along said fill tube.

9. The adapter according to claim 8 wherein the collar includes perforation between the first and second ends to enable venting of the gas tank wherein the collar is expandable.

10. The adapter according to claim 9 wherein said fill tube includes tabs disposed a top thereof to prevent the top from insertion into the filler neck.

11. The adapter according to claim 10 wherein said nozzle receptacle includes guide slots for passing over the fill tube tabs as said nozzle receptacle is slid over said fill tube.

12. The adapter according to claim 11 wherein said guide slots include detents for releasably locking said nozzle receptacle to said fill tube with the collar compressed.

* * * * *